US012723286B2

(12) United States Patent
Baumgart et al.

(10) Patent No.: US 12,723,286 B2
(45) **Date of Patent: *Sep. 1, 2026**

(54) SURFACE-HARDENED, ROTATIONALLY SYMMETRICAL WORKPIECE, HARDENING METHOD AND HARDENING APPARATUS

(71) Applicant: WALZENGIESSEREI COSWIG GMBH, Coswig (DE)

(72) Inventors: Sven Baumgart, Diera-Zehren (DE); Stefan Nelle, Elsterwerda (DE); Tino Noack, Großenhain (DE); Thomas Füssel, Ottendorf-Okrilla (DE)

(73) Assignee: WALZENGIESSEREI COSWIG GMBH, Coswig (DE)

( * ) Notice: Subject to any disclaimer, the term of this patent is extended or adjusted under 35 U.S.C. 154(b) by 558 days.

This patent is subject to a terminal disclaimer.

(21) Appl. No.: 18/348,781

(22) Filed: Jul. 7, 2023

(65) Prior Publication Data

US 2023/0349018 A1 Nov. 2, 2023

Related U.S. Application Data

(63) Continuation of application No. 16/614,247, filed as application No. PCT/EP2018/063804 on May 25, 2018, now Pat. No. 11,697,858.

(30) Foreign Application Priority Data

May 26, 2017 (DE) ......................... 102017111541.2

(51) Int. Cl.
*C21D 9/28* (2006.01)
*B21B 3/02* (2006.01)
(Continued)

(52) U.S. Cl.
CPC .................. *C21D 9/28* (2013.01); *B21B 3/02* (2013.01); *C21D 1/09* (2013.01); *C21D 9/22* (2013.01);
(Continued)

(58) Field of Classification Search
CPC ... C21D 9/28; C21D 1/09; C21D 9/22; C21D 9/38; B21B 3/02; F16C 3/02;
(Continued)

(56) References Cited

U.S. PATENT DOCUMENTS 4,533,815 A 8/1985 Ecer
4,628,179 A 12/1986 Crahay
(Continued)

FOREIGN PATENT DOCUMENTS

CN 102010940 4/2011
DE 2940127 4/1980
(Continued)

*Primary Examiner* — Rebecca Janssen
(74) *Attorney, Agent, or Firm* — Heslin Rothenberg Farley & Mesiti P.C.

(57) ABSTRACT

The invention relates to a surface-hardened, rotationally symmetrical workpiece, to a hardening method and to a hardening apparatus. The proposed hardening apparatus comprises a machine frame on which two coaxially arranged rotary bearings designed to support a rotationally symmetrical workpiece are arranged, at least one rotary bearing being operatively connected to a drive device to generate rotation of the workpiece; and at lease one laser apparatus for generating focused, high-energy radiation is arranged on said rotary bearing, said laser apparatus being movable in the axial direction, and the radiation being directed toward the workpiece.

16 Claims, 2 Drawing Sheets

Figure 1:
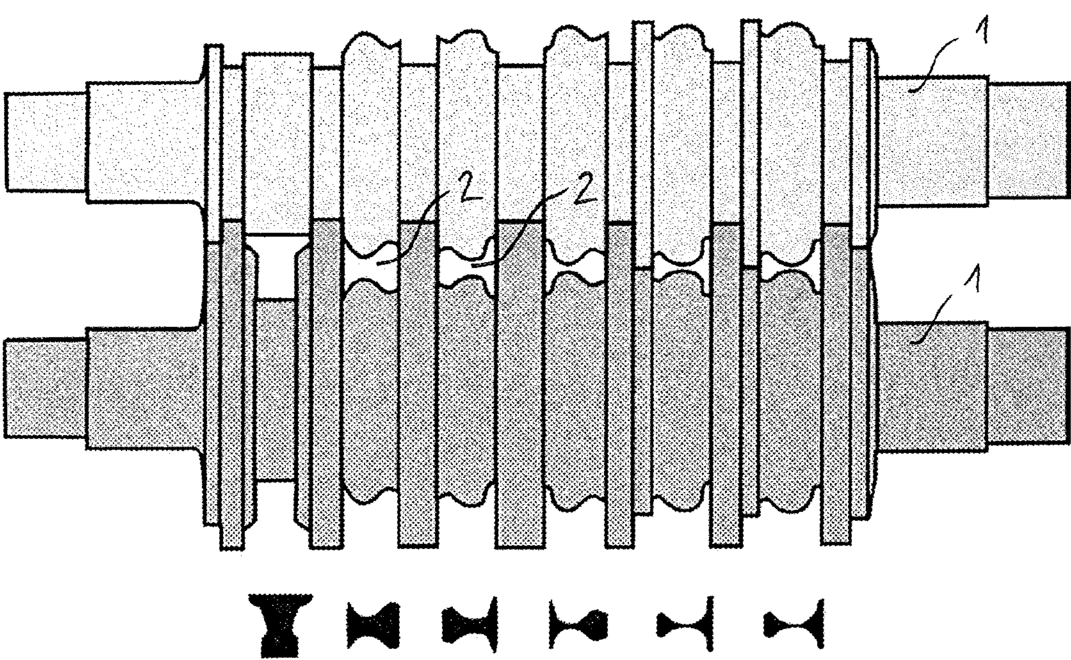

(51) Int. Cl.

| | |
|---|---|
| ***C21D 1/09*** | (2006.01) |
| ***C21D 9/22*** | (2006.01) |
| ***F16C 3/02*** | (2006.01) |
| *F03D 80/70* | (2016.01) |

(52) U.S. Cl.
CPC ................ *F16C 3/02* (2013.01); *F03D 80/70* (2016.05); *F05B 2230/41* (2013.01); *F05B 2240/60* (2013.01); *F16C 2223/10* (2013.01); *F16C 2360/31* (2013.01)

(58) Field of Classification Search
CPC .. F16C 2223/10; F16C 2360/31; F03D 80/70; F05B 2230/41; F05B 2240/60
See application file for complete search history.

(56) References Cited

U.S. PATENT DOCUMENTS

| | | | | |
|---|---|---|---|---|
| 2003/0080098 A1 | | 5/2003 | Yamazaki | |
| 2013/0068741 A1* | | 3/2013 | Pillai ...................... | B23K 26/08 219/121.85 |
| 2017/0022584 A1* | | 1/2017 | Domínguez ............. | C21D 1/09 |

FOREIGN PATENT DOCUMENTS

| | | | | |
|---|---|---|---|---|
| DE | 4001144 | | 11/1990 | |
| DE | 4001144 C1 * | | 11/1990 | ............... C21D 9/28 |
| DE | 4242540 | | 6/1994 | |
| DE | 112013004368 | | 6/2015 | |
| JP | 2015063715 | | 4/2015 | |
| WO | 2016011223 | | 1/2016 | |

* cited by examiner

SURFACE-HARDENED, ROTATIONALLY SYMMETRICAL WORKPIECE, HARDENING METHOD AND HARDENING APPARATUS

CROSS-REFERENCE TO RELATED APPLICATIONS

This application is a continuation of U.S. application Ser. No. 16/614,247, filed Nov. 15, 2019, which is a 35 U.S.C. § 371 National Stage application of International Patent Application No. PCT/EP2018/063804, filed May 25, 2018, which claims the benefit of German Application Serial Number 10 2017 111 541.2, filed May 26, 2017; the contents of each of which are incorporated by reference herein in their entireties.

BACKGROUND ART

The invention relates to a surface-hardened rotationally symmetrical workpiece, a hardening method and a hardening apparatus. In particular, the invention relates to rotationally symmetrical tools that have on their lateral surface at least one working area which, during use of the tool as intended, acts on a material to be worked.

Examples of such tools are rolls, as are used in rolling mills for shaping steel products, and cones, as are used in cone crushers for breaking up rock. Methods for the surface hardening of such products and apparatuses for carrying out such methods are also proposed.

Martensitic transformation hardening by the action of concentrated high-energy laser radiation is known. In laser hardening, the outer layer of carbon-containing ferrous materials (C content >0.3%) is heated up so quickly that the cooling down takes place as self-quenching by the surrounding cold layers of material. The process of heating up, austenitizing and quenching for martensite formation is the same as in the case of the conventional martensitic hardening technology, but takes place in shorter times and at higher temperatures to just below the melting limit. The hardness penetration depth is limited to values below 2 mm because the self-quenching must be ensured by way of heat conduction and the limitation of the surface temperature to the melting temperature limits the austenitizing depth.

The application of laser hardening has so far also been limited to small areas of the surface of a workpiece to be hardened, because the area of action of the focused laser beam is relatively small, and therefore not only would hardening of very large surfaces in this way be very time-consuming, but it has previously not appeared to be possible to obtain a homogeneous hardening over the entire surface in this way.

The invention therefore addresses the problem of providing methods and apparatuses which make it possible to harden even relatively large surfaces relatively homogeneously, in particular surfaces of large rotationally symmetrical workpieces such as shape rolls for steel rolling mills, crusher cones for cone crushers, drive shafts for wind turbines or other energy-generating or converting installations and the like, and to indicate application areas for these methods and apparatuses.

SUMMARY OF THE INVENTION

This problem is solved by a hardening method with the features of claim 1, a hardening apparatus with the features of claim 9 and a rotationally symmetrical workpiece with the features of claim 16. Advantageous refinements and developments are the subject of the dependent claims.

Proposed is firstly a hardening method for the surface hardening of a rotationally symmetrical workpiece with a lateral surface and a longitudinal axis, in which at least one laser device is directed onto the workpiece in such a way that concentrated high-energy radiation generated by the laser device acts on an area of action of the lateral surface, wherein

- the workpiece is held rotatably about its longitudinal axis and set in rotation about its longitudinal axis at a selectable rotational speed, and
- the at least one laser device is moved along the longitudinal axis of the workpiece.

The proposed hardening method makes it possible to harden relatively large surface areas of rotationally symmetrical workpieces comparatively quickly, easily and with a very homogeneous variation in hardness. Contributing especially to this is that, because of the distance between the surface area to be hardened and the laser device remaining constant during the rotation of the workpiece, the intensity of the high-energy radiation generated by the laser device likewise remains constant, and that, as a result of the combination of rotation (of the workpiece) and translation (of the laser device), the laser device can pass over large surface areas without any gaps. In principle two different method variants are possible for this:

- in a first, intermittent method variant of the proposed hardening method, it may be provided that
  - at least during one full revolution of the workpiece, the laser device is held fixed in place in relation to the longitudinal axis thereof,
  - then the laser device is moved along the longitudinal axis by a selectable axial adjusting displacement, and
  - the two steps above are repeated one or more times.

In other words, the energy beam generated by the laser device initially passes over an annular surface area, the width of which is determined by the width of the area of action of the incident laser beam. If this annular surface area is complete after a full revolution of the workpiece, the rotation of the tool is stopped. The laser device is moved further in the longitudinal direction of the workpiece.

For example, the adjusting displacement of the laser device may be chosen to be less than or equal to an axial extent of the area of action and the two steps (full rotation of the workpiece, axial displacement of the laser device) repeated as often as it takes until the area of action of the laser device passes over the lateral surface of the workpiece without any gaps.

The adjusting displacement of the laser device may therefore be chosen for example to be of such a size that two successive, hardened annular surface areas directly adjoin one another, i.e. the adjusting displacement corresponds to the width of the area of action of the laser device, measured in the longitudinal direction of the workpiece. Alternatively, the adjusting displacement may also be chosen to be smaller, because the hardness penetration depth decreases toward the periphery of the annular surface area. There is thus a certain overlap of two successive, hardened annular surface areas, whereby this effect can be compensated, in particular if radiation is applied with high intensity and the rotational speed is so high that the first-irradiated annular surface area has not yet cooled down completely when the next annular surface area is irradiated. For special applications, the adjusting displacement may also be chosen to be greater than the width of the area of action of the laser device, measured in the longitudinal direction of the workpiece, whereby an annular surface area between two adjacent annular hardened surface areas remains unhardened.

In a second, continuous method variant of the proposed hardening method, it may be provided that, during the rotation of the workpiece, the laser device is moved in relation to the longitudinal axis thereof. This produces a spiral, i.e. helical, hardened surface area.

In this case it may be provided for example that the laser device is moved at an axial speed chosen in relation to the selected rotational speed of the workpiece and the axial extent of the area of action such that the area of action of the laser device passes over the lateral surface of the workpiece without any gaps.

By analogy with what is described above with respect to the intermittent method variant, accordingly, for surface hardening without any gaps, the adjusting speed of the laser device in the axial direction may either be chosen such that the area of action of the laser beam at every point in time reaches exactly up to the previous turn of the helical line, or that the area of action still overlaps a peripheral strip of the previous turn of the helical line. Alternatively, here, too, for special applications the adjusting speed of the laser device in the axial direction can be chosen such that an unhardened helical line remains between every two turns of the hardened helical line.

In the case of the continuous method variant of the proposed hardening method, it may also be provided that

- first the laser device is moved from a first position to a second position in relation to the lateral surface in the axial direction, and
- then the laser device is moved back from the second position to the first position.

As a result, two hardened helical lines with opposite directions of rotation are superposed, whereby, in particular in the last-mentioned cases in which unhardened surface areas are maintained alongside the hardened helical line, a rhomboid pattern is obtained on the surface to be hardened, which is of interest in particular for special applications still to be discussed in more detail.

In order to achieve a surface hardening that is as homogeneous as possible, in the case of the proposed hardening method it may also be provided that the rotational speed of the workpiece is chosen, dependent on the radiation output of the laser device, the size of the area of action and the diameter of the workpiece, such that the energy per unit area that is introduced into the lateral surface is substantially constant.

In addition, the hardening method may in this case be designed such that the rotational speed of the workpiece is chosen, dependent on a local diameter of the workpiece, such that the energy per unit area that is introduced into the lateral surface is substantially constant even when there is an axially variable local diameter of the workpiece. Since the circumference of the workpiece is linearly dependent on the diameter, in the case of this refinement the rotational speed of the workpiece must be reduced if the current diameter that the area of action of the laser device passes over increases during the axial movement of the laser device. By analogy, the rotational speed of the workpiece must be increased if the current diameter that the area of action of the laser device passes over decreases during the axial movement of the laser device. In this way it is possible to achieve the effect that the circumferential speed of the workpiece in the surface area passed over by the area of action of the laser device is kept constant.

The proposed hardening method may for example be carried out on an apparatus that keeps the workpiece rotating and arranged alongside which is an industrial robot, which holds the laser device such that the radiation impinges on the surface to be hardened and which during the method moves the laser device parallel to the longitudinal axis of the workpiece.

As an alternative to this, the proposed hardening method may be carried out on a hardening apparatus for the surface hardening of a rotationally symmetrical workpiece that is specifically designed for this and comprises a machine frame on which two coaxially arranged rotary bearings designed for receiving a rotationally symmetrical workpiece are arranged, wherein at least one rotary bearing is operatively connected to a drive device for generating a rotation of the workpiece, and on which at least one laser device for generating a concentrated high-energy radiation, which is movable in the axial direction, is arranged, the radiation being directed onto the workpiece.

This apparatus therefore performs the functions of holding and turning the workpiece and also holding and axially moving the laser device at the same time. As a result, desired parameters of the method, for example the rotational speed of the workpiece, the adjusting speed of the laser device, the radiation output of the laser device, etc., can be set, monitored and possibly regulated, i.e. controlled in an open-loop or closed-loop manner, particularly easily and advantageously.

For this reason, according to a further refinement, the proposed hardening apparatus comprises a control device, which is designed for influencing the energy input into the workpiece for controlling the rotation of the workpiece or/and the translation of the at least one laser device or/and the output of the at least one laser device.

In a development of the hardening apparatus, it may be provided that a plurality of laser devices are arranged and aligned at a respective radial distance from the outer lateral surface of the workpiece, distributed about the longitudinal axis of the workpiece, such that the radiation generated by them impinges on the workpiece over the entire circumference of the workpiece.

According to a further refinement of the proposed hardening apparatus, it may be provided that the laser device or the plurality of laser devices is/are operatively connected to a drive device for generating a movement in the axial direction of the workpiece. This drive device, for example an electric motor, may in this case move the laser device at an axial speed chosen in relation to the selected rotational speed of the workpiece and the axial extent of the area of action such that the area of action of the laser device passes over the lateral surface of the workpiece without any gaps.

In an advantageous refinement, the proposed hardening apparatus may be operated such that the rotational speed of the workpiece is chosen, dependent on the radiation output of the laser device, the size of the area of action and the diameter of the workpiece, such that the energy per unit area that is introduced into the lateral surface is substantially constant.

Particularly advantageously, the proposed hardening apparatus may be operated in such a way that the rotational speed of the workpiece is chosen, dependent on a local diameter of the workpiece, such that the energy per unit area that is introduced into the lateral surface is substantially constant even when there is an axially variable local diameter of the workpiece.

The proposed hardening method and the proposed hardening apparatus may be used particularly advantageously in the production of a rotationally symmetrical workpiece which is intended to have on its lateral surface at least one hardened surface area. Such workpieces may be used for example as a rotationally symmetrical tool which has on its lateral surface at least one working area which, during use of the tool as intended, acts on a material to be worked.

Examples of a rotationally symmetrical tool that can be worked by using the proposed method or/and on the proposed apparatus are a shape roll of a steel rolling mill, which has a shaft and, arranged on the shaft, at least one caliber, the outer lateral surface of which has the hardened surface area, a crusher cone of a cone crusher, the outer lateral surface of which has the hardened surface area, a drive shaft of an energy-generating or converting installation, for example a wind turbine, which has, arranged on the shaft, at least one bearing seat, the outer lateral surface of which has the hardened surface area, etc.

BRIEF DESCRIPTION OF THE DRAWING FIGURES

Figure 2:
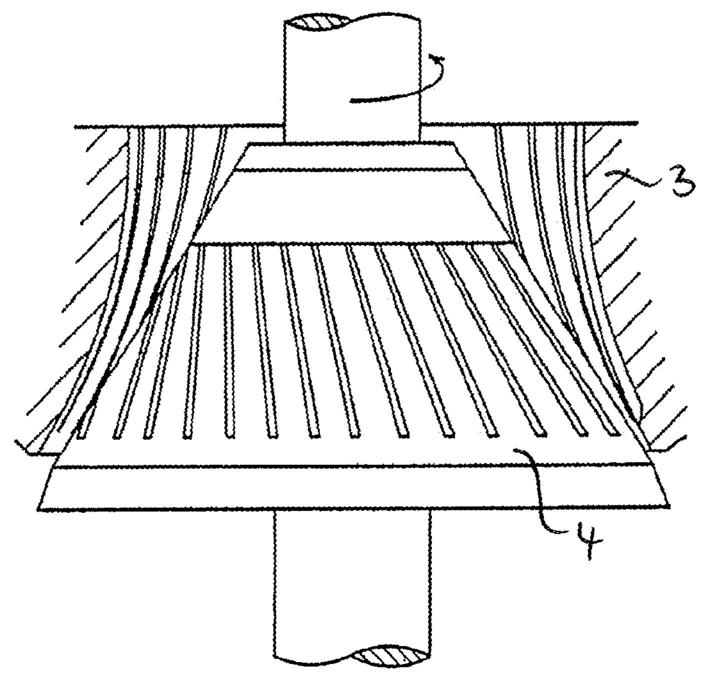
Figure 3:
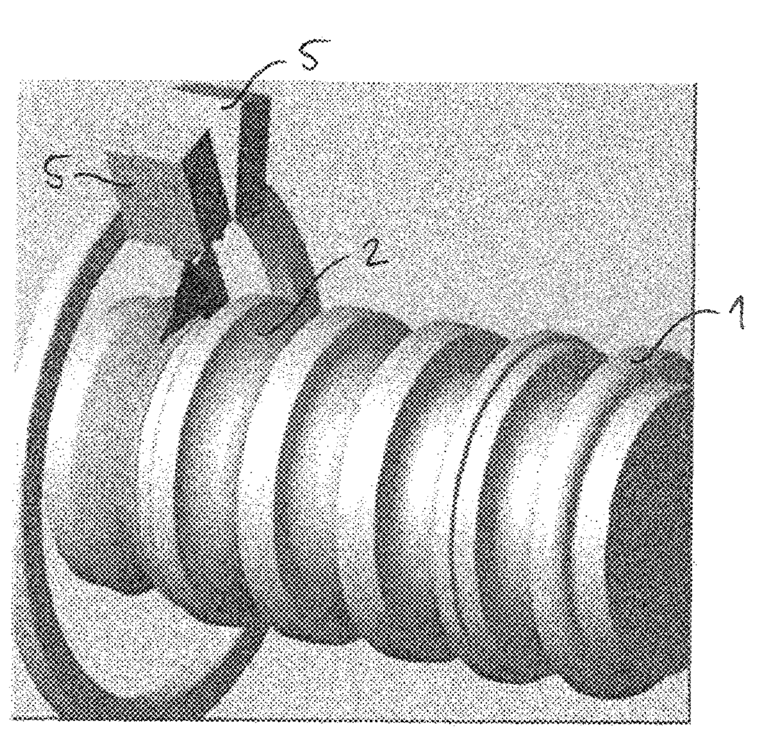

The invention is explained in more detail below on the basis of exemplary embodiments and associated drawings, in which FIG. 1 shows a schematic representation of two shape rolls interacting in a steel rolling mill, FIG. 2 shows a crusher cone of a cone crusher, and FIG. 3 shows the surface hardening of a shape roll by means of two laser devices.

DETAILED DESCRIPTION

FIG. 1 shows two interacting, oppositely running shape rolls 1, as are used in steel rolling mills for the production of steel profiles. The term "caliber" 2 relates to the shaping in the roll barrel for the rolling of long products. The circumferential grooves in the shape rolls 1 along with the grooves of the counter roll and the roll spacing produce the shape. The closed calibers 2 shown here, respectively formed by the interaction of the upper and lower shape rolls 1, allow all-round shaping. Shape rolls 1 are subject to a very high level of wear in their life cycle. This wear can be reduced, and their lifetime thereby increased considerably, by a hardened surface layer of the shape roll 1.

FIG. 2 shows by way of example the structure of a cone crusher, which is used for breaking up rock. In a crusher housing 3, a crusher cone 4 is arranged at a distance from the inner wall of the crusher housing 3 that becomes smaller from the top downward. The crusher cone 4 is fitted in such a way as to rotate about its vertical axis. Pieces of rock fed in from above are broken up by the friction to which the rock is subjected between the inner wall of the crusher housing 3 and the outer lateral surface of the crusher cone 4. The fragments thereby produced fall further into the downwardly tapering annular gap between the crusher housing 3 and the crusher cone 4 and are in turn broken up. This process continues until the fragments produced are so small that they are no longer held in the annular gap and therefore fall downward out of the cone crusher. Because of the action of the pieces of rock, the crusher cone 4 is also subjected to a very high level of wear. This wear can be reduced by a hardened surface layer of the lateral surface of the crusher cone 4, and its lifetime thereby increased considerably.

With the proposed hardening method it is possible either to subject the lateral surface of the crusher cone 4 to a complete surface hardening, or only to harden the lateral surface selectively, for example in strips. In this case it is also possible for example to produce hardened strips that form a rhomboid pattern. The selective hardening has the effect that the pieces of rock wear away the unhardened areas more, so that over time erosion effects that increase the breaking-up effect of the cone crusher occur between the hardened areas.

FIG. 3 shows a first method variant for the surface hardening of a shape roll 1 in the area of the calibers arranged on it. For this purpose, the shape roll 1 is rotatably mounted in a hardening apparatus, which generates a controlled rotational movement of the shape roll 1.

Arranged on or alongside the hardening apparatus is at least one laser device 5, which may be held for example by an industrial robot that is movable in all directions. The laser device 5 projects a laser beam directly onto the shape roll 1. By means of a control device, the laser beam follows the geometry of the shape roll in a spiral, lines or other conceivable forms.

By this method, hardness traces with a hardening depth of about 1 mm are produced on the shape roll 1. The hardness is determined by the material and may be an increase of up to about 30% in comparison with the base material.

Unfortunately, the formation of traces has an adverse influence on the geometry of the rolled stock. This formation of traces occurs if the laser beam does not have the necessary width to cover the entire profile, so that many traces have to be laid next to one another in a spiral in the radial direction, or where the laser bombardment begins and ends.

To avoid the formation of traces, the overlapping of adjacent traces may be increased such that a uniform hardness layer is produced, for example in that adjacent traces overlap by 5 mm or 10 mm.

A further possibility for avoiding the formation of traces is to irradiate the shape roll 1 with two laser devices 5, which move around the shape roll 1. For this purpose, the laser devices 5 may begin with the irradiation together at any desired point on the shape roll 1 and then move on an encircling path around the shape roll 1. The two laser devices 5 meet on the exactly opposite side (180°) of the shape roll 1 and end the irradiation.

Alternatively, one laser device 5 may be fixedly arranged, the shape roll 1 set in a rotational movement and the second laser device 5 moved in a circling manner as far as the starting point (360°).

LIST OF DESIGNATIONS

1 Shape roll
2 Caliber
3 Crusher housing
4 Crusher cone
5 Laser device

The invention claimed is:

1. A method, comprising:

obtaining a rotationally symmetrical workpiece with a lateral surface and a longitudinal axis, wherein at least a portion of the lateral surface comprises hardened portions of differing diameters formed by:

generating, via at least one laser device, concentrated high-energy laser radiation that acts on an area of action of the lateral surface;

moving the at least one laser device along the longitudinal axis of the workpiece such that the laser radiation acts on differing portions of the lateral surface along the longitudinal axis of the workpiece;

rotating the workpiece about its longitudinal axis at a first rotational speed when the laser radiation acts on a first portion of the lateral surface along the longitudinal axis having a first local diameter to form a first hardened portion; and rotating the workpiece about its longitudinal axis at a second rotational speed that differs from the first rotational speed when the laser radiation acts on a second portion of the lateral surface along the longitudinal axis having a second local diameter that differs from the first local diameter to form a second hardened portion, wherein the first and second rotational speeds of the workpiece are dependent on the radiation output of the laser device, the size of the area of action and the respective first and second local diameters of the workpiece, such that an energy per unit area that is introduced into the first and second portions is substantially constant.

2. The method of claim 1, wherein the workpiece is configured as a shape roll for a rolling mill.

3. The method of claim 2, wherein the shape roll comprises a shaft with at least one caliber arranged thereon, and wherein outer lateral surface portions of the at least one caliber comprises the hardened portions.

4. The method of claim 1, wherein the workpiece is configured as a crusher cone.

5. The method of claim 1, wherein the workpiece is configured as a drive shaft.

6. The method of claim 5, wherein the drive shaft comprises a bearing seat arranged thereon, and wherein outer lateral surface portions of the at least one bearing seat the hardened portions.

7. The method of claim 1, wherein the second local diameter is less than the first local diameter, and the second rotational speed is greater than the first rotational speed.

8. The method of claim 1, wherein the second local diameter is greater than the first local diameter, and the second rotational speed is less than the first rotational speed.

9. The method of claim 1, wherein the laser device is held fixed in place in relation to the longitudinal axis of the workpiece for at least one full revolution of the workpiece when the laser radiation acts on a portion of the first portion of the lateral surface and the workpiece is rotated at the first rotational speed, and when the laser radiation acts on a portion of the second portion of the lateral surface and the workpiece is rotated at the second rotational speed.

10. The method of claim 9, wherein the laser device is moved along the longitudinal axis by a selectable axial adjusting displacement after being held fixed in place for the at least one full revolution such that the laser radiation acts on other portions of the respective first and second portions of the lateral surface.

11. The method of claim 10, wherein cycles of the laser device being held fixed in place for the at least one full revolution and then moved along the longitudinal axis by the selectable axial adjusting displacement are repeated one or more times such that the laser radiation acts on all of the first and second portions of the lateral surface.

12. The method of claim 10, wherein the selectable axial adjusting displacement is less than or equal to an axial extent of the area of action.

13. The method of claim 12, wherein cycles of the laser device being held fixed in place for the at least one full revolution and then moved along the longitudinal axis by the selectable axial adjusting displacement are repeated until the area of action of the laser device passes over all of the first and second portions of the lateral surface without any gaps.

14. The method of claim 1, wherein, during the rotation of the workpiece at at least one the first rotational speed and the second rotational speed, the laser device moves continuously along the longitudinal axis.

15. The method of claim 14, wherein the laser device moves continuously along the longitudinal axis in a pattern that comprises:

moving axially from a first axial position to a second axial position in relation to the lateral surface, and after moving axially from the first axial position to the second axial position, moving axially back from the second axial position to the first axial position.

16. The method of claim 14, wherein the laser device moves along the longitudinal axis of the workpiece at an axial speed that is dependent on the rotational speed of the workpiece and the axial extent of the area of action such that the area of action of the laser device passes over at least the first and second portions of the lateral surface of the workpiece without any gaps.

* * * * *